United States Patent
Hird et al.

(10) Patent No.: US 8,949,616 B2
(45) Date of Patent: Feb. 3, 2015

(54) METHODS, APPARATUS AND SYSTEMS FOR SECURING USER-ASSOCIATED PASSWORDS USED FOR IDENTITY AUTHENTICATION

(75) Inventors: Geoffrey Hird, Cupertino, CA (US); Jiann-Shi Andy Lee, Fremont, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 13/231,817

(22) Filed: Sep. 13, 2011

(65) Prior Publication Data

US 2012/0066504 A1    Mar. 15, 2012

Related U.S. Application Data

(60) Provisional application No. 61/382,376, filed on Sep. 13, 2010.

(51) Int. Cl.
| | | |
|---|---|---|
| *G06F 21/00* | (2013.01) | |
| *G06F 21/31* | (2013.01) | |
| *H04L 29/06* | (2006.01) | |
| *H04L 9/32* | (2006.01) | |

(52) U.S. Cl.
CPC .............. *G06F 21/31* (2013.01); *H04L 63/083* (2013.01); *H04L 9/3226* (2013.01)
USPC ............................................. 713/183; 726/5

(58) Field of Classification Search
None
See application file for complete search history.

(56) References Cited

U.S. PATENT DOCUMENTS

| | | | | |
|---|---|---|---|---|
| 5,661,807 A | * | 8/1997 | Guski et al. ................... | 713/159 |
| 6,704,868 B1 | * | 3/2004 | Challener et al. ............. | 713/168 |
| 6,826,686 B1 | * | 11/2004 | Peyravian et al. ............ | 713/168 |
| 6,983,377 B1 | * | 1/2006 | Beesley et al. ................. | 726/12 |
| 7,882,553 B2 | * | 2/2011 | Tuliani .............................. | 726/9 |
| 7,899,753 B1 | * | 3/2011 | Everhart .......................... | 705/67 |
| 7,904,946 B1 | * | 3/2011 | Chu et al. .......................... | 726/5 |
| 8,266,441 B2 | * | 9/2012 | Inskeep et al. ................ | 713/185 |
| 8,302,167 B2 | * | 10/2012 | Mennes et al. .................... | 726/5 |
| 8,327,422 B1 | * | 12/2012 | Friedman et al. ................. | 726/5 |
| 8,572,394 B2 | * | 10/2013 | Hird et al. ..................... | 713/184 |
| 2002/0026573 A1 | * | 2/2002 | Park ............................. | 713/155 |
| 2002/0159601 A1 | * | 10/2002 | Bushmitch et al. ........... | 380/277 |
| 2002/0184509 A1 | * | 12/2002 | Scheidt et al. ................ | 713/185 |
| 2003/0046593 A1 | * | 3/2003 | Xie et al. ...................... | 713/202 |

(Continued)

OTHER PUBLICATIONS

International Search Report and the Written Opinion of the International Searching Authority dated Feb. 1, 2012, PCT Application No. PCT/US2011/051471 filed Sep. 13, 2011, 6 pages.

(Continued)

*Primary Examiner* — Michael R Vaughan
(74) *Attorney, Agent, or Firm* — Vierra Magen Marcus LLP

(57) ABSTRACT

Methods, apparatus and systems for securing user-associated passwords used in transactions are disclosed. The methods include a user computing device receiving a user-associated password such as a PIN from a user, where the user-associated password is operable to authenticate an identity of a user. The user-associated password may be received in response to the user receiving a request for the user-associated password from a third party such as a merchant. The user computing device may generate a temporary password such as a one-time password, dynamic password, or the like, and encrypt the user-associated password using the temporary password. The encrypted user-associated password may then be communicated to the third party in lieu of the user-associated password received by the user.

19 Claims, 9 Drawing Sheets

(56) References Cited

U.S. PATENT DOCUMENTS

| | | |
|---|---|---|
| 2006/0136739 A1* | 6/2006 | Brock et al. .................. 713/184 |
| 2006/0156026 A1* | 7/2006 | Utin .............................. 713/183 |
| 2006/0242698 A1* | 10/2006 | Inskeep et al. .................. 726/20 |
| 2007/0133591 A1* | 6/2007 | Shatford ....................... 370/457 |
| 2007/0277044 A1* | 11/2007 | Graf et al. ..................... 713/185 |
| 2008/0123843 A1* | 5/2008 | Machani ......................... 380/44 |
| 2008/0201577 A1* | 8/2008 | Tuliani .......................... 713/168 |
| 2008/0276098 A1* | 11/2008 | Florencio et al. ............. 713/183 |
| 2009/0083372 A1 | 3/2009 | Teppler |
| 2009/0185687 A1* | 7/2009 | Wankmueller et al. ....... 380/277 |
| 2009/0193264 A1* | 7/2009 | Fedronic et al. .............. 713/184 |
| 2009/0210347 A1 | 8/2009 | Sarcanin |
| 2009/0235339 A1* | 9/2009 | Mennes et al. .................... 726/5 |
| 2009/0288143 A1* | 11/2009 | Stebila et al. ..................... 726/3 |
| 2010/0017604 A1* | 1/2010 | Husa .............................. 713/168 |
| 2011/0060913 A1* | 3/2011 | Hird et al. ..................... 713/184 |
| 2011/0113237 A1* | 5/2011 | Hird et al. ..................... 713/155 |
| 2011/0197266 A1* | 8/2011 | Chu et al. .......................... 726/5 |
| 2014/0040629 A1* | 2/2014 | Hird et al. ..................... 713/184 |

OTHER PUBLICATIONS

European Office Action dated Apr. 19, 2013, European Patent Application No. 11825826.8 filed Sep. 13, 2011, 2 pages.

Response to European Office Action dated Aug. 20. 2013, European Patent Application No. 11825826.8, filed Sep. 13, 2011, 8 pages.

Response to Office Action dated Oct. 20, 2014, European Patent Application No. 11825826.8.

* cited by examiner

US 8,949,616 B2

METHODS, APPARATUS AND SYSTEMS FOR SECURING USER-ASSOCIATED PASSWORDS USED FOR IDENTITY AUTHENTICATION

CROSS-REFERENCES TO RELATED APPLICATIONS

This application claims priority to U.S. Provisional Patent Application No. 61/382,376, filed Sep. 13, 2010, entitled "ONE-TIME PASSWORD FOR MOBILE TRANSACTIONS," the entire disclosure of which is hereby incorporated by reference in its entirety for all purposes.

BACKGROUND

Embodiments of the present invention relate to methods, apparatus and systems for securing user-associated passwords used for identity authentication, and in particular to securing user-associated passwords that are used for authenticating the identity of parties engaged in transactions.

An increasing number of people engage in electronic transactions, telephone transactions, and other types of transactions in which at least one of the parties to the transaction relies on funds or other types of value to be provided or distributed by an entity other than that party. For example, an individual engaged in a purchase transaction with a merchant may rely on their banking institution to provide funds to the merchant through a bank or credit account held by the banking institution for the individual. In these types of transactions, it is often desirable to authenticate the identity of the party (e.g., the individual) to reduce the risk of unauthorized transactions.

Various techniques for authenticating the identity of a party engaged in a transaction include some form of soliciting the party for a user-associated password, where the party has previously registered the user-associated password with an authenticating agent. For example, the user-associated password may be a personal identification number (PIN) registered by the party at the banking institution at which the party holds funds. This type of PIN is often entered at and passed through a merchant during a transaction. For another example, the user-associated password may be a password that is solicited by an account issuer and which, during a transaction with a merchant, is communicated to the account issuer while bypassing the merchant. A recently developed security protocol that uses such passwords is the 3-D Secure protocol that has been implemented by various account issuers and marketed under names such as Verified by Visa™ (by Visa, Inc. of San Francisco, Calif.), MasterCard Securecode™ (by MasterCard Worldwide, Inc. of New York, N.Y.), J/Secure™ (by JCB Co., Ltd of Tokyo, Japan), and SafeKey™ (by American Express Co. of New York, N.Y.).

While the use of user-associated passwords increases the integrity of transactions, problems with engaging in secure transactions still widely persist. For example, if an unauthorized third party gains access to the user-associated password of another, they may use that user-associated password to engage in unauthorized transactions by posing themselves as the party which registered the user-associated password.

BRIEF SUMMARY

Embodiments of the present invention overcome some or all of the aforementioned deficiencies in the related art. According to some embodiments, methods, apparatuses, and systems for securing user-associated passwords used for identity authentication are disclosed. In one embodiment, a method of encrypting authentication information is disclosed. The method includes one or more operations, including receiving a user-associated password operable to authenticate an identity of a user, generating a temporary password, and encrypting the user-associated password using at least the temporary password resulting in an encrypted user-associated password. In some embodiments, the encrypted user-associated password may then be communicated in response to a request for a user-associated password and in place of the user-associated password.

In another embodiment, a method of decrypting authentication information is disclosed. The method includes receiving an encrypted user-associated password, where the user-associated password is operable to authenticate an identity of a user. The method further includes generating a temporary password and decrypting the encrypted user-associated password using the temporary password resulting in a user-associated password.

In yet another embodiment, a device for encrypting authentication information is disclosed. The device may include a storage element operable to store a user-associated password, where the user-associated password is operable to authenticate an identity of a user. The device may further include a processor operable to generate a temporary password and encrypt the user-associated password using at least the temporary password resulting in an encrypted user-associated password. In some embodiments, the device may further include a communication interface operable to display the encrypted user-associated password to the user.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Figure 1:
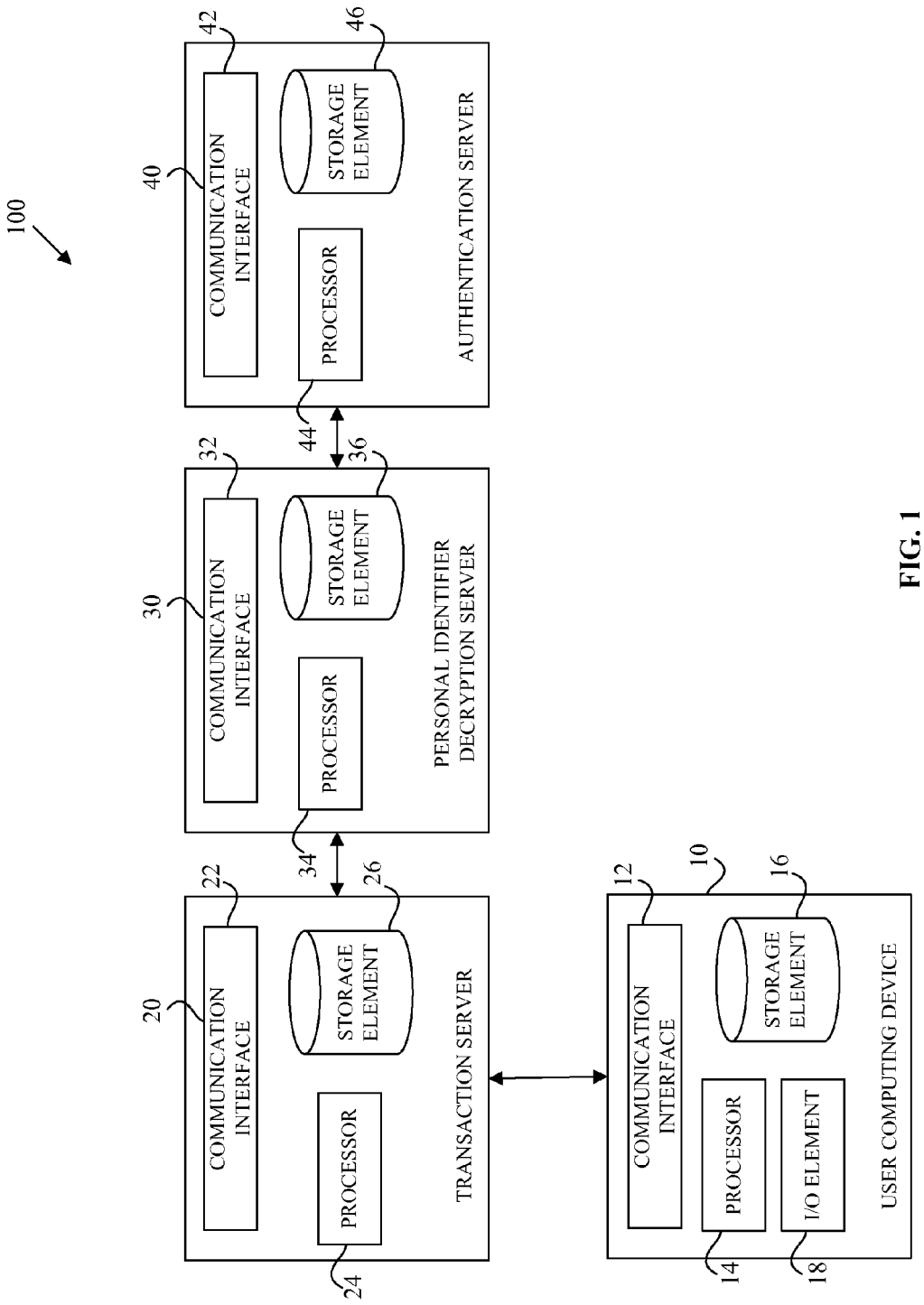
FIG. 1 is a simplified system illustrating an environment operable to implement aspects of one or more of the various embodiments disclosed herein.

Embodiments of the inventions discussed herein describe solutions whereby temporary password such as one-time passwords (OTPs) and the like may be used to encrypt and decrypt datum that is destined for transmission through a hostile environment. There are many variants, but herein is discussed a use case in which OTPs generated in accordance with the Europay, Mastercard, and Visa consortium (EMV) standards are typically used. However, those skilled in the art would easily recognize how the techniques disclosed herein may similarly be applied to other cryptography standards, such as the Internet Engineering Task Force (IETF) standard Hashed Method Authentication Code (HMAC) OTP, and all such alternative implements are intended to be encompassed within the scope of this application.

One use case considered herein is where a user-associated password, such as a 6 decimal digit password belonging to a user and associated with a user account held by, for example, a banking institution, is to be communicated through the hostile environment. The user-associated password may be referred to, for example, as a PIN. In various embodiments, the user would type the PIN into a web form during an online purchase, or transmit it via a mobile device application, or speak it into a phone, or send it by some other means to a remote server for verification. The PIN needs to be protected as it passes through the merchant to the verification server.

Advances in the generation of OTPs have recently been disclosed. For example, U.S. application Ser. No. 12/938,666, entitled "Key Camouflaging Method Using a Machine Identifier", which is incorporated by reference herein in its entirety for all purposes, discloses, among other things, techniques for camouflaging OTPs. And U.S. application Ser. No. 13/020,867, entitled "Method and System for Multiple Passcode Generation", which is incorporated by reference herein in its entirety for all purposes, discloses, among other things, techniques for generating multiple OTPs on a single device such as a cellphone.

OTPs, while becoming increasingly widespread, are generally themselves communicated as a password. However, in some of the embodiments discussed herein, the OTPs, in addition or alternatively to being communicated as a password, are used, at least in part, to encrypt the user's PIN. In some embodiments, an OTP may be generated and used to encrypt the user's PIN, whereby the resulting encrypted PIN is in the same form (e.g., 6-digit decimal form) as the originally requested PIN. The user may then communicate the encrypted PIN rather than the actual PIN, thereby increasing the security of the user's PIN. Further, by generating an encrypted PIN in the same form as the originally requested PIN, existing merchant systems may be used, thereby increasing the efficiency of implementation.

Various techniques for using OTPs to encrypt the user's PIN are disclosed. In one specific technique, an Advanced Encryption Standard Key (AES) key may be generated from the OTP, the PIN may be padded to satisfy the block size requirements of the AES algorithm, and the padded result (i.e., the padded PIN) may be encrypted using the AES algorithm. In another specific technique, an authorization request cryptogram (ARQC) can be generated in accordance with the Europay, Mastercard, and Visa consortium (EMV) standards for Chipcards. A dynamic password (DP) can then be generated from the ARQC and used as a seed to a format preserving encryption (FPE) key. The PIN may then be encrypted using the FPE key. In this case, the PIN can be thought of us numbers on the tumblers of a combination lock, where encrypting the PIN includes rotating each tumbler according to the number in the corresponding position in the DP. In yet another specific technique, the ARQC can be used directly as the key. In one instance, the ARQC can be used as a seed to generate an FPE key. In another instance, a bitwise XOR operation can be performed between the ARQC and the PIN. For example, the ARQC and PIN can both be represented in binary form, and the bitwise XOR operation can be performed between the PIN and, for example, the initial part of the ARQC.

Once the PIN has been encrypted, it may be communicated through the potentially hostile environment. The encrypted PIN must subsequently be decrypted so that the user's PIN may then be used for authentication purposes. To facilitate such a decryption, decryption algorithms may be incorporated at the authentication server that typically receives and performs authentication with the user's PIN, or may be incorporated in an additional server or system such as a PIN decryption server. The decryption algorithms may be any suitable algorithms for decrypting the PIN. For example, where the PIN is encrypted using an OTP, the decryption algorithm may be operable to generate an identical OTP and use the generated OTP to decrypt the encrypted PIN so as to extract the user's PIN.

In some techniques disclosed herein, synchronization information may be used for the encryption/decryption process. OTP mechanisms sometimes use synchronization of the generating client (e.g., mobile device) and the authenticating server, which is typically based on either a counter, or a time. In EMV, the counter is called the Application Transaction Counter (ATC). The ATC is used as input to the generation of the cryptogram, by both the client and the authenticating server. The ATC is a datum of 2 bytes (16 bits). The DP may include part of the ATC. Not all of the ATC needs to be sent, but enough to enable re-synchronization (in case of drift) with very high probability. The high part of the decimal DP may include a select number of bits of the ATC. The authenticating server may then use the received ATC bits to re-generate the OTP and use the generated OTP for decrypting the received encrypted PIN.

Adding the ATC bits can be performed in numerous ways. For example, the encrypted PIN can be represented in binary form, the ATC bits added to the binary form of the encrypted PIN, and the result converted to decimal form. The authenticating server may then convert the received information to binary form, examine or extract the ATC bits, regenerate the matching ARQC or DP, and decrypt the PIN using the ATC bits to recover the user's PIN.

While these techniques for encrypting and decrypting authentication information (e.g., a user's 6-digit PIN in decimal form) have been mentioned and are incorporated as embodiments of the present invention, the scope of the invention is not intended to be so limited. For example, where EMV-based OTP encryption and decryption techniques have been discussed, other kinds of OTP, such as the Internet Engineering Task Force (IETF) standard Hashed Method Authentication Code (HMAC) OTP, may be used in much the same way.

FIG. 1 is a simplified system 100 illustrating an environment operable to implement aspects of one or more of the various embodiments disclosed herein. System 100 includes a user computing device 10, a transaction server or system 20, a user-associated password decryption server or system 30, and an authentication server or system 40. Each of these elements of system 100 may be operable to communicate either directly or indirectly with one another using any suitable communication infrastructure such as an intranet, an extranet, a public switched telephone network, an infrared network, a wireless network, a wireless data network, a cellular network, or any other such network or combination thereof.

User computing device 10 may be any suitable electronic computing device, such as a mobile phone, a personal digital assistant (PDAs), a handheld or portable device (iPhone, Blackberry, etc.), a notebook, personal computer, note pad or other electronic device configured for wired or wireless communication. User computing device 10 may include any suitable components typically found in such electronic device necessary to perform the operations discussed herein.

In one embodiment and as illustrated in FIG. 1, user computing device 10 includes a communication interface 12, a processor 14, a tangible non-transitory computer readable storage element 16, and input/output element 18. Communication interface 12 is any suitable interface or interfaces operable to enable communication between user computing device 10 and other elements of system 100, such as transaction server 20, user-associated password decryption server 30, and/or authentication server 40. Processor 14 is any suitable computing processor or processors operable to execute instructions that cause user computing device 10 to perform one or more of the operations discussed herein. For example, processor 14 may execute software code stored in one or more storage elements such as storage element 16. Storage element 16 may be any storage element or storage elements suitable for storing data, software code, and other information used by user computing device 10. For example, storage element 16 may include one or more of random access memory (RAM), read only memory (ROM), electrically-erasable programmable read only memory (EEPROM), a hard disk, an optical disk, etc. In one embodiment, storage element 16 may store one or more passcode applications, keys, algorithms, and/or passcode generators, such as those discussed in U.S. application Ser. No. 12/938,666, entitled "Key Camouflaging Method Using a Machine Identifier", and U.S. application Ser. No. 13/020,867, entitled "Method and System for Multiple Passcode Generation", both of which are incorporated by reference herein in their entity for all purposes. Input/output element 18 may include one or more elements for receiving input from a user and providing outputs to the user. For example, input/output element 18 may include a keypad, a display, a touch screen, or a combination thereof.

Transaction server or system 20 may be any suitable electronic computing device or system of electronic computing devices operable to engage in a transaction with a user. In some embodiments, transaction server 20 may engage in a transaction with a user via user computing device 10. For example, transaction server 20 may be an electronic computing device or system of electronic computing devices associated with a merchant at which the user wishes to engage in a transaction for goods or services. For another example, transaction server 20 may be associated with a bank or other financial institution with which the user wishes to engage in a transaction. In some embodiments, transaction server 20 may be included in other elements of system 100, and/or some or all of the operations discussed herein with respect to transaction server 20 may be performed by one or more other elements of system 100, such as user-associated password decryption server 30 and/or authentication server 40. Transaction server 20 may include any suitable components typically found in such systems necessary to perform the operations discussed herein.

In one embodiment and as illustrated in FIG. 1, transaction server 20 includes a communication interface 22, a processor 24, and a tangible non-transitory computer readable storage element 26. Communication interface 22 is any suitable interface or interfaces operable to enable communication between transaction server 20 and other elements of system 100, such as user computing device 10, user-associated password decryption server 30, and/or authentication server 40. Processor 24 is any suitable computing processor or processors operable to execute instructions that cause transaction server 20 to perform one or more of the operations discussed herein. For example, processor 24 may execute software code stored in one or more storage elements such as storage element 26. Storage element 26 may be any storage element or storage elements suitable for storing data, software code, and other information used by transaction server 20. For example, storage element 26 may include one or more of random access memory (RAM), read only memory (ROM), electrically-erasable programmable read only memory (EEPROM), a hard disk, an optical disk, etc.

User-associated password decryption server or system 30 may be any suitable electronic computing device or system of electronic computing devices operable to decrypt a user-associated password associated with a user. In some embodiments, user-associated password decryption server 30 may receive an encrypted user-associated password from another element of system 100, such as user computing device 10 or transaction server 20. Upon reception, user-associated password decryption server 30 may be operable to decrypt the user-associated password and communicate the decrypted user-associated password to other elements of system 100, such as authentication server 40. In some embodiments, user-associated password decryption server 30 may be included in other elements of system 100, and/or some or all of the operations discussed herein with respect to user-associated password decryption server 30 may be performed by one or more other elements of system 100, such as authentication server 40. User-associated password decryption server 30 may include any suitable components typically found in such systems necessary to perform the operations discussed herein.

In one embodiment and as illustrated in FIG. 1, user-associated password decryption server 30 includes a communication interface 32, a processor 34, and a tangible non-transitory computer readable storage element 36. Communication interface 32 is any suitable interface or interfaces operable to enable communication between user-associated password decryption server 30 and other elements of system 100, such as user computing device 10, transaction server 20, and/or authentication server 40. Processor 34 is any suitable computing processor or processors operable to execute instructions that cause user-associated password decryption server 30 to perform one or more of the operations discussed herein. For example, processor 34 may execute software code stored in one or more storage elements such as storage element 36. Storage element 36 may be any storage element or storage elements suitable for storing data, software code, and other information used by user-associated password decryption server 30. For example, storage element 36 may include one or more of random access memory (RAM), read only memory (ROM), electrically-erasable programmable read only memory (EEPROM), a hard disk, an optical disk, etc.

Authentication server or system 40 may be any suitable electronic computing device or system of electronic computing devices operable to authenticate the identity of a user upon receiving a user-associated password. The user-associated password may be pre-stored at authentication server 40 and associated with a user during, for example, a registration process. If a received user-associated password matches that stored for a user, authentication server 40 may communicate an authentication confirmation to one or more other elements of system 100, such as transaction server 20. Authentication server 40 may be associated with any suitable entity for authentication transactions. For example, authentication server 40 may be associated with a banking or other financial institution. In some embodiments, authentication server 40 may be included in other elements of system 100, and/or some or all of the operations discussed herein with respect to authentication server 40 may be performed by one or more other elements of system 100, such as user-associated password decryption server 30. Authentication server 40 may include any suitable components typically found in such systems necessary to perform the operations discussed herein.

In one embodiment and as illustrated in FIG. 1, authentication server 40 includes a communication interface 42, a processor 44, and a tangible non-transitory computer readable storage element 46. Communication interface 42 is any suitable interface or interfaces operable to enable communication between authentication server 40 and other elements of system 100, such as user computing device 10, transaction server 20, and/or user-associated password decryption server 30. Processor 44 is any suitable computing processor or processors operable to execute instructions that cause authentication server 40 to perform one or more of the operations discussed herein. For example, processor 44 may execute software code stored in one or more storage elements such as storage element 46. Storage element 46 may be any storage element or storage elements suitable for storing data, software code, and other information used by authentication server 40. For example, storage element 46 may include one or more of random access memory (RAM), read only memory (ROM), electrically-erasable programmable read only memory (EEPROM), a hard disk, an optical disk, etc.

System 100 in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of system 100 in FIG. 1 should be taken as being illustrative in nature, and not limiting to the scope of the disclosure.

Figure 2:
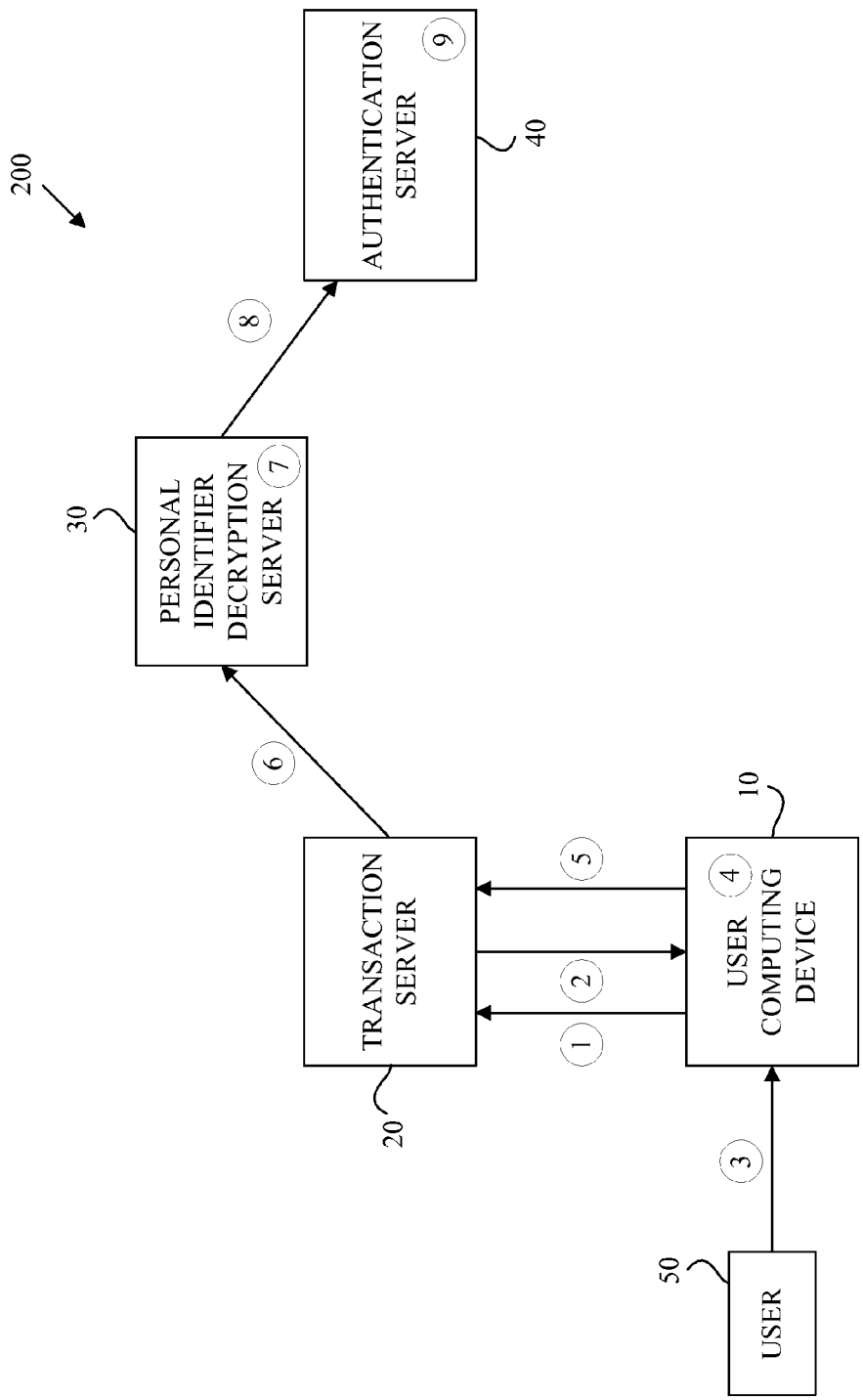
FIG. 2 is a simplified system and a sequence of operations illustrating an environment and transaction sequence operable to implement aspects of one or more of the various embodiments disclosed herein.

FIG. 2 is a simplified system 200 and a sequence of operations illustrating an environment and transaction sequence operable to implement aspects of one or more of the various embodiments disclosed herein. Like numbered references correspond to the same or similar components discussed with reference to FIG. 1. Further to the embodiment to discussed with reference to FIG. 1, system 200 also includes user 50 which is a party desiring to engage in a transaction with a second party such as a party associated with transaction server 20. User 50 may be associated with user computing device 10 and use user computing device 10 to assist in facilitating the transaction.

The sequence of operations shown in FIG. 2 is a sequence of operations that proceeds from operation 1 through operation 9. Embodiments of the present invention are not intended to be limited to this particular sequence, but rather this sequence is illustrated and discussed as an example of a simplified sequence of operations in which embodiments of the present invention may be used to facilitate a transaction between multiple parties.

In operation 1, user computing device 10 communicates a transaction request to transaction server 20. The transaction request may be a request to engage in a transaction, such as the purchase of goods or services, the transfer of funds, access to a secure resource, etc. The transaction request may be communicated in any suitable fashion. For example, user 50 may use user computing device 10 to login to a webpage of a merchant (or banking institution, financial institution, or other entity which user 50 desires to engage in a transaction with) associated with transaction server 20, where the webpage is hosted by transaction server 20 or other suitable entity, and communicate the transaction request via the webpage. For another example, user 50 may use user computing device 10 to perform a telephone call with the merchant associated with transaction server 20, where the transaction request is communicated by voice to the merchant. For yet another example, user 50 may communicate the transaction request directly to the merchant associated with transaction server 20, such as in a mortar and concrete type of retail environment. Other suitable techniques for communicating a transaction request to an entity with which user 50 wishes to engage in a transaction may be easily recognized by those of ordinary skill in the art, and all such techniques are within the scope of the embodiments disclosed herein.

In operation 2, in response to receiving the transaction request, transaction server 20 communicates an authentication request to user computing device 10. The authentication request may be a request for user 50 to provide information for authenticating the identity of user 50, such as a user-associated password, where the user-associated password is operable to authenticate an identity of the user. In some embodiments, the authentication request may be a request for a numerical personal identification number (PIN) such as a PIN associated with a bank card or credit card. In other embodiments, the authentication request may be a request for a password using a security protocol such as the 3-D Secure protocol, in which case the password may be a numeric string, text string, or a combination thereof. An authenticating entity such as authentication server 40 may store a copy of the user-associated password which may subsequently be used to confirm the identity of user 50 by matching the stored copy of the user-associated password with the user-associated password communicated by the user.

The authentication request may be communicated in any suitable fashion. For example, transaction server 20 may communicate the request to user computing device 10 for display on input/output element 18 of user computing device 10. For another example, a merchant or other entity associated with transaction server 20 may verbally communicate the authentication request to user 50 via input/output element 18 of user computing device 10. For yet another example, transaction server 20 may communicate the authentication request to user 50 via an input/output element (not shown) such as a PIN pad associated with transaction server 20. Other suitable techniques for communicating an authentication request to user 50 may be easily recognized by those of ordinary skill in the art, and all such techniques are within the scope of the embodiments disclosed herein.

In operation 3, in response to the authentication request, user 50 enters a user-associated password into user computing device 10. For example, user 50 may enter their user-associated password into user computing device 10 using input/output element 18. The user-associated password may be input by voice, text, or other any suitable communication means. In some embodiments, the user-associated password may already be stored in, for example, storage element 16 of user computing device 10. For example, the user-associated password may be pre-stored in user computing device 10 during, for example, a registration process during which user 50 registers their identity with authentication server 40. Other suitable techniques for communicating a user-associated password and/or storing a user-associated password in user computing device 10 may be easily recognized by those of ordinary skill in the art, and all such techniques are within the scope of the embodiments disclosed herein.

In operation 4, in response to receiving the user-associated password or a user selection selecting a pre-stored user-associated password, using computing device 10 encrypts the user-associated password. User computing device 10 may encrypt the user-associated password using any suitable encryption technique, and in some embodiments, user computing device 10 uses one or more of the encryption techniques discussed herein with reference to FIGS. 4A to 6. As a result of encrypting the user-associated password, user computing device 10 may generate an encrypted user-associated password.

In operation 5, user computing device 10 communicates the encrypted user-associated password to transaction server 20. The encrypted user-associated password is communicated to transaction server 20 in lieu of the requested user-associated password. Like the transaction request of operation 1, the encrypted user-associated password may be communicated in any suitable fashion. For example, user 10 may use user computing device 10 to communicate the encrypted user-associated password via a webpage, telephone call, etc. For another example, user 10 may communicate the encrypted user-associated password directly to the merchant associated with transaction server 20 without using user computing device 10 (e.g., the encrypted user-associated password may be displayed by user computing device 10 and subsequently conveyed verbally by the user). In some embodiments, the encrypted user-associated password may additionally or alternatively be communicated to other elements of system 100. For example, the encrypted user-associated password may be communicated to user-associated password decryption server 30 without passing to or through transaction server 20. Other suitable techniques for communicating an encrypted user-associated password for authenticating user 50 who wishes to engage in a transaction may be easily recognized by those of ordinary skill in the art, and all such techniques are within the scope of the embodiments disclosed herein.

In operation 6, transaction server 20 communicates the encrypted user-associated password to user-associated password decryption server 30. Transaction server 20 may communicate the encrypted user-associated password using any suitable communication means, such as communication interface 22. In some embodiments, the encrypted user-associated password is in the same form (e.g., a 6 digit decimal form) as the expected user-associated password. Accordingly, transaction server 20 may receive and communicate the encrypted user-associated password using systems and structures that are already provided for receiving and communicating the user-associated password. In other embodiments, the encrypted user-associated password may be in a different form as the expected user-associated password, in which case transaction server 20 may be customized to receive and communicate the encrypted user-associated password. Other suitable techniques for communicating the encrypted user-associated password may be easily recognized by those of ordinary skill in the art, and all such techniques are within the scope of the embodiments disclosed herein.

In operation 7, in response to receiving the encrypted user-associated password, user-associated password decryption server 30 decrypts the encrypted user-associated password. User-associated password decryption server 30 may decrypt the encrypted user-associated password using any suitable decryption technique, and in some embodiments, user-associated password decryption server 30 uses one or more of the decryption techniques discussed herein with reference to FIGS. 7A to 7C. As a result of decrypting the encrypted user-associated password, user-associated password decryption server 30 may generate a decrypted user-associated password.

In operation 8, user-associated password decryption server 30 communicates the decrypted user-associated password to authentication server 40. User-associated password decryption server 30 may communicate the encrypted user-associated password using any suitable communication means, such as communication interface 32. In some embodiments, the decrypted user-associated password is in the same form (e.g., a 6 digit decimal form) as the expected user-associated password. Accordingly, authentication server 40 may receive and process the user-associated password using systems and structures that are already provided for receiving and processing the user-associated password. Other suitable techniques for communicating the decrypted user-associated password may be easily recognized by those of ordinary skill in the art, and all such techniques are within the scope of the embodiments disclosed herein.

In operation 9, authentication server 40 processes the received decrypted user-associated password. In processing the received decrypted user-associated password, authentication server 40 may operate to authenticate the identity of user 50. For example, authentication server 40 may compare the decrypted user-associated password to a pre-stored user-associated password associated with user 50. If the decrypted user-associated password matches the pre-stored user-associated password, authentication server 40 may communicate an authentication response indicating that the identity of user 50 has been authenticated. If the decrypted user-associated password does not match the pre-stored user-associated password, authentication server 40 may communicate an authentication response indicating that the identity of user 50 has not been authenticated. Authentication server 40 may communicate the authentication response to any suitable entity operable to satisfy the transaction request of operation 1. For example, authentication server 40 may communicate the authentication response to transaction server 20. Other suitable techniques for processing and communicating the decrypted user-associated password may be easily recognized by those of ordinary skill in the art, and all such techniques are within the scope of the embodiments disclosed herein.

System 200 in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 2. Thus, the depiction of system 200 in FIG. 2 should be taken as being illustrative in nature, and not limiting to the scope of the disclosure. Further, it should be appreciated that the specific operations discussed with reference to FIG. 2 provide a particular method of engaging in a transaction, according to certain embodiments of the present invention. Other sequences of operations may also be performed according to alternative embodiments. For example, additional or alternative operations may be used to facilitate the transaction request. Moreover, the individual operations discussed with reference to FIG. 2 may include multiple sub-operations that may be performed in various sequences as appropriate to the individual operation. Furthermore, additional operations may be added or existing operations removed depending on the particular applications. One of ordinary skill in the art would recognize and appreciate many variations, modifications, and alternatives.

Figure 3:
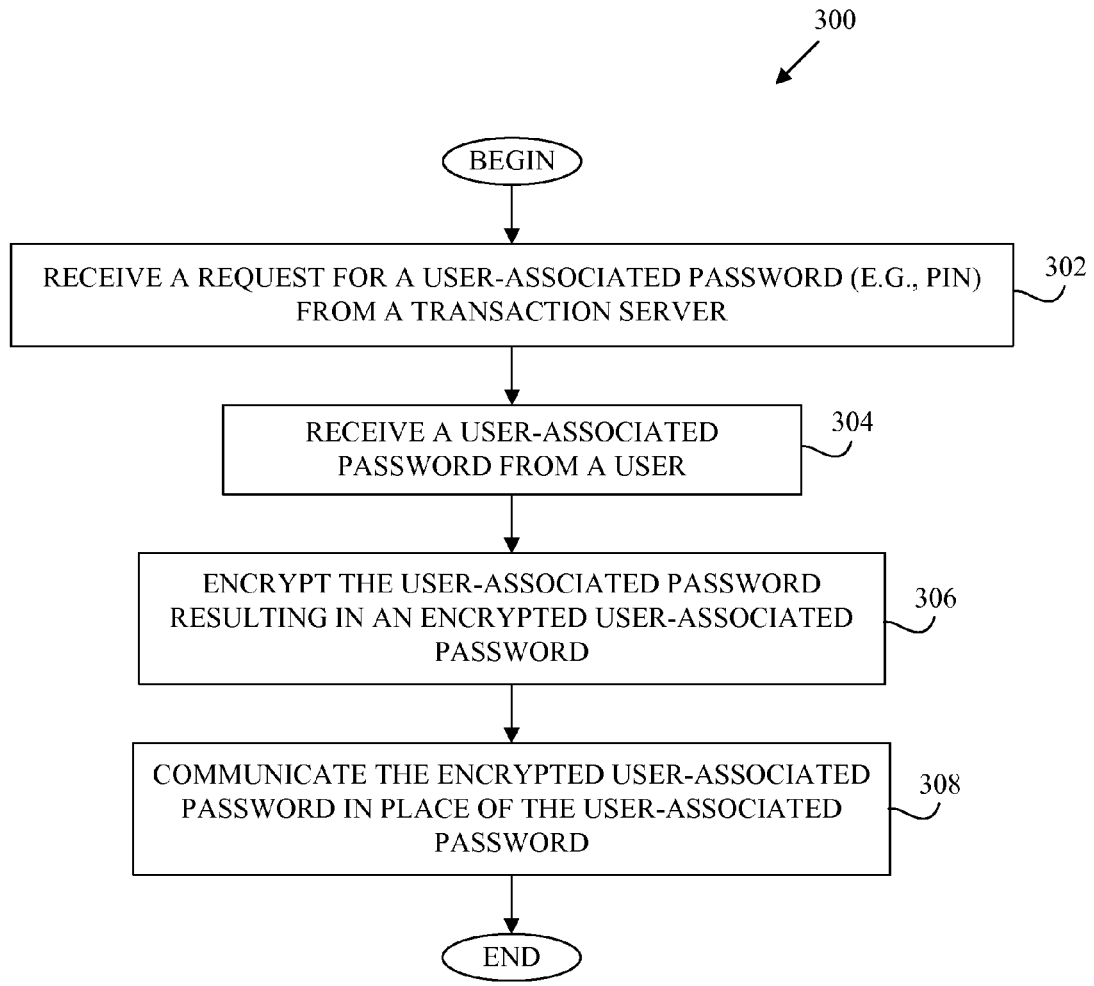
FIG. 3 is a flowchart depicting operations of a user computing device in accordance with a first embodiment.

FIG. 3 is a flowchart depicting operations 300 of a user computing device 10 in accordance with a first embodiment. Operations 300 depict a sequence of operations by which user computing device 10 may operate to facilitate authentication of a user associated with user computing device 10, such as user 50 discussed with reference to FIG. 2. The authentication may be performed as part of a process in which user 50 desires to engage in a transaction, such as a transaction for the purchase of goods or services, the transfer of funds, access to a secure resource, etc. as discussed with reference to FIG. 2. While operations 300 are discussed with reference to the systems 100 and 200 discussed with reference to FIGS. 1 and 2, and with reference to the sequence of operations discussed with reference to FIG. 2, operations 300 may additionally or alternatively be applied to other systems and sequences of operations in which user authentication is desired, and all such alternatives are within the scope of the embodiments disclosed herein.

In operation 302, user computing device 10 (see FIGS. 1 and/or 2) receives a request for a user-associated password from transaction server 20 (see FIGS. 1 and/or 2). The request for the user-associated password may be part of or the entire authentication request discussed with reference to FIG. 2. Similar to the authentication request discussed with reference to FIG. 2, the request for the user-associated password may be communicated to a user of user computing device in any suitable fashion. For example, transaction server 20 may communicate the request to user computing device 10 for display on input/output element 18 of user computing device 10. For another example, a merchant or other entity associated with transaction server 20 may verbally communicate the request to user 50 via input/output element 18 of user computing device 10. For yet another example, transaction server 20 may communicate the request to user 50 via an input/output element (not shown) such as a PIN pad associated with transaction server 20. Other suitable techniques for communicating a user-associated password request to user 50 may be easily recognized by those of ordinary skill in the art, and all such techniques are within the scope of the embodiments disclosed herein.

The user-associated password requested may be have any suitable form. For example, the requested user-associated password may be a numerical PIN associated with a bank card or credit card. For another example, the requested user-associated password may be a password in the form of a numeric string, text string, or a combination thereof. The user-associated password requested may be part of any suitable security protocol that includes user authentication. For example, the user-associated password request may be part of the 3-D Secure protocol. The user-associated password may be a variable length human-readable and/or human enterable string, or may be a sequence of bytes having some role in authentication. The user-associated password need not be easy for a human to store and enter, and thus can be stored and entered using devices other than a human means. For example, the user-associated password may be a binary sequence that is communicated between devices by means of an optical QR code, barcode, or the like.

In operation 304, user computing device 10 receives a user-associated password from user 50. Receipt of a user-associated password may be similar to that discussed with reference to operation 3 and FIG. 2. In some embodiments, user 50 may enter the user-associated password into user computing device 10 using input/output element 18. In other embodiments, the user-associated password may be pre-stored in user computing device 10.

In operation 306, user computing device 10 encrypts the received user-associated password. Encryption of the received user-associated password may be similar to operation 4 discussed with reference to FIG. 2. In some embodiments, processor 14 may operate to execute one or more encryption algorithms stored in storage element 16 to encrypt the received user-associated password. The one or more encryption algorithms may include one or more of the operations discussed with reference to FIGS. 4A to 4D. As a result of encrypting the user-associated password, user computing device 10 may generate an encrypted user-associated password.

In operation 308, user computing device 10 communicates the encrypted user-associated password in place of the requested user-associated password. That is, user computing device 10 may respond to the request for a user-associated password with the encrypted user-associated password rather than the user-associated password. Similar to operation 5 discussed with reference to FIG. 2, the encrypted user-associated password may be communicated in any suitable fashion to any suitable element of system 100 and/or 200 in any suitable fashion, including displaying the encrypted user-associated password using, for example, the input/output element 18 of user computing device 10.

Figure 4A:
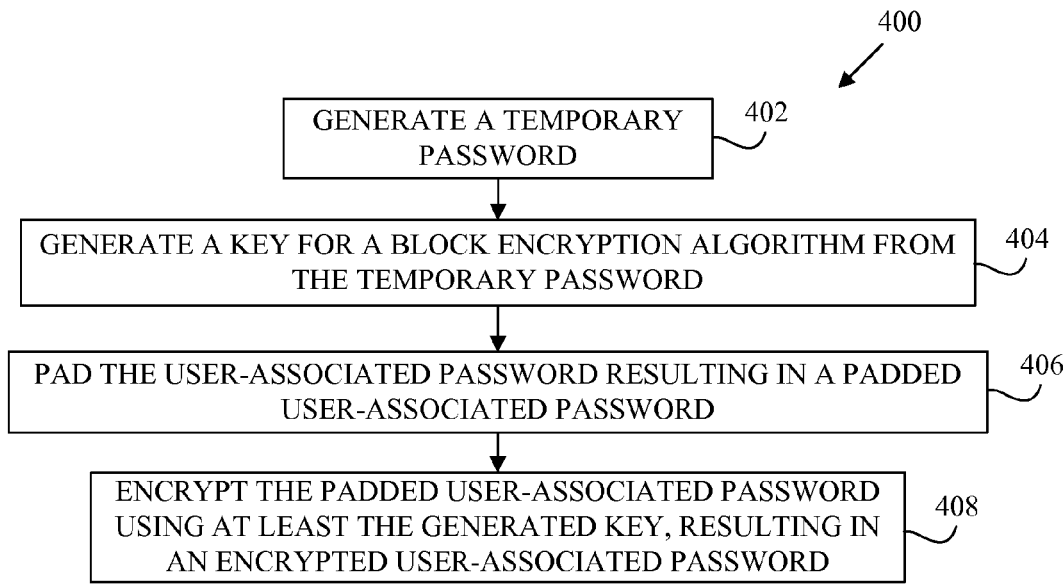
FIG. 4A is a flowchart depicting operations for encrypting a user-associated password in accordance with a first embodiment.

FIG. 4A is a flowchart depicting operations 400 for encrypting a user-associated password in accordance with a first embodiment. Operations 400 depict a sequence of operations by which a device such as user computing device 10 may operate to encrypt a user-associated password, such as the user-associated password discussed with reference to FIGS. 2 and/or 3. The encryption may be performed as part of a process in which user 50 desires to engage in a transaction, such as a transaction for the purchase of goods or services, the transfer of funds, access to a secure resource, etc. as discussed with reference to FIG. 2. While operations 400 are discussed with reference to the systems 100 and 200 shown FIGS. 1 and 2, and with reference to the sequence of operations discussed with reference to FIGS. 2 and 3, operations 400 may additionally or alternatively be applied to other systems and sequences of operations in which user authentication is desired, and all such alternatives are within the scope of the embodiments disclosed herein.

In operation 402, user computing device 10 generates a temporary password. The password may be temporary in the sense that the password is valid for authentication purposes only for a limited number of transactions or transaction attempts. For example, the password may be valid for a single transaction or transaction attempt, or for a plurality of transactions or transaction attempts. In some embodiments, multiple temporary passwords may be generated for a single transaction, whereby only the latest generated password is valid for authentication purposes. In such cases, a more recently generated password may operate to render a previously generated password invalid for authentication purposes.

In one embodiment, the temporary password may be a dynamic password (DP) as known in the art. For example, the DP may be a DP as utilized by Visa, Inc. in its Dynamic Passcode Authentication (DPA) protocol, or as utilized by MasterCard Worldwide, Inc. in its Chip Authentication Protocol (CAP). In another embodiment, the temporary password may be one-time password (OTP) generated using any suitable one-time password generating algorithm. For example, the OTP may be a time-synchronized OTP, an OTP generated using a mathematical algorithm that does not rely on time synchronization, or the OTP may be generated using any other suitable algorithm.

In some embodiments, the algorithms for generating the temporary password may be stored in, for example, storage element 16 of user computing device 10, for the purposes of encryption. Similar algorithms for generating temporary passwords or derivations thereof may be stored in, for example, storage element 36 of user-associated password decryption server 30, for the purposes of decryption. The algorithms may be stored as software code and/or may be implemented in hardware.

In operation 404, user computing device 10 generates a key for a block encryption algorithm from the temporary password. The key may be generated for use with any suitable block encryption algorithm. For example, the key may be generated for use with algorithms including the advanced encryption standard (AES), the data encryption standard (DES), Blowfish, CAST-128, Serpent, etc. In some embodiments, the algorithm may be a format preserving encryption (FPE) algorithm, whereby the format of the input to the algorithm is preserved. That is, the format of the output of the algorithm is the same as the format of the input to the algorithm. For example, where the input is a 6-digit number in binary form, the output is also a 6-digit number in decimal form.

In operation 406, user computing device 10 pads the user-associated password resulting in a padded user-associated password. The user-associated password may be padded with any suitable data, including any suitable number of bits. For example, where the encryption algorithm uses blocks of data, such as AES, the user-associated password may be padded with enough data to satisfy the block size requirement of the encryption algorithm.

In operation 408, user computing device 10 encrypts the padded user-associated password using at least the generated key. User computing device 10 may encrypt the padded user-associated password using any suitable block encryption algorithm, such as AES, DES, Blowfish, CAST-128, Serpent, etc. As a result of the encryption, user computing device 10 may generate an encrypted user-associated password which may then be communicated in response to receiving a request for a user-associated password.

Figure 4B:
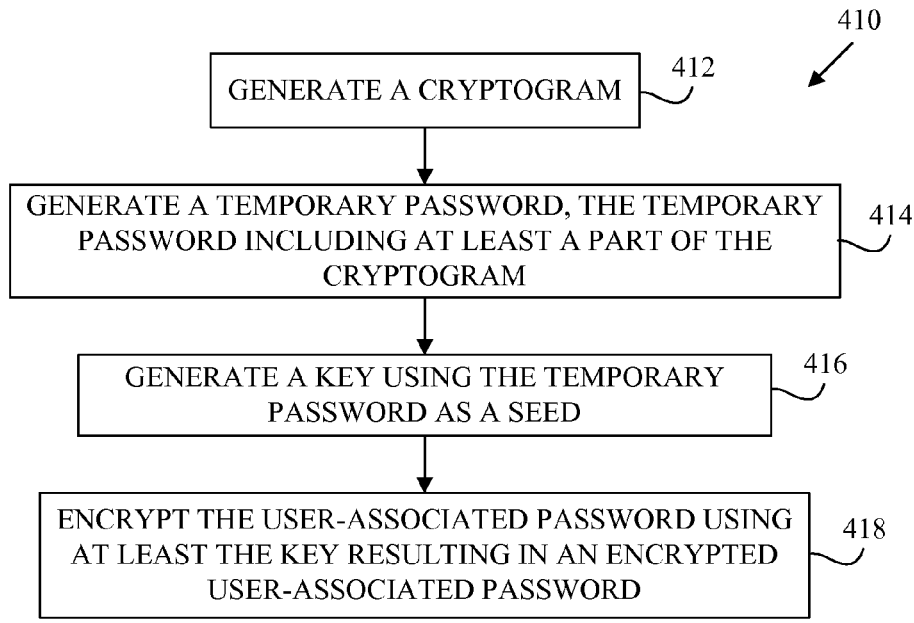
FIG. 4B is a flowchart depicting operations for encrypting a user-associated password in accordance with a second embodiment.

FIG. 4B is a flowchart depicting operations 410 for encrypting a user-associated password in accordance with a second embodiment. Operations 410 depict a sequence of operations by which a device such as user computing device 10 may operate to encrypt a user-associated password, such as the user-associated password discussed with reference to FIGS. 2 and/or 3. The encryption may be performed as part of a process in which user 50 desires to engage in a transaction, such as a transaction for the purchase of goods or services, the transfer of funds, access to a secure resource, etc. as discussed with reference to FIG. 2. While operations 410 are discussed with reference to the systems 100 and 200 discussed with reference to FIGS. 1 and 2, and with reference to the sequence of operations discussed with reference to FIGS. 2 and 3, operations 410 may additionally or alternatively be applied to other systems and sequences of operations in which user authentication is desired, and all such alternatives are within the scope of the embodiments disclosed herein.

In operation 412, user computing device 10 generates a cryptogram. The cryptogram may be any suitable cryptogram as known in the art. For example, the cryptogram may be an authorization request cryptogram (ARQC) generated in accordance with the Europay, Mastercard, and Visa consortium (EMV) standards for Chipcards. The cryptogram may be temporary, like the temporary password. For example, a particular cryptogram may be valid only for a single transaction. In some embodiments, the algorithms for generating the cryptogram may be stored in, for example, storage element 16 of user computing device 10, for the purposes of encryption. Similar algorithms for generating cryptograms or derivations thereof may be stored in, for example, storage element 36 of user-associated password decryption server 30, for the purposes of decryption. The algorithms may be stored as software code and/or may be implemented in hardware.

In operation 414, user computing device 10 generates a temporary password. The temporary password generated may be similar to that discussed in operation 402 with reference to FIG. 4A. However, in this case, the temporary password may be generated at least in part from the cryptogram generated in operation 412.

In some embodiments, a portion of the cryptogram may be incorporated into at least a portion of the temporary password. For example, the cryptogram may be an ARQC, and the temporary password may be a dynamic password (DP) as previously discussed. The DP may use bits from the ARQC, whereby an increased numbers of bits from the ARQC tends to increase the unpredictability of the content of the DP. In one embodiment, the number and choice of bits from the ARQC used in the DP may be programmed into a data element such as the Issuer Proprietary Bitmap (IPB) of a Chipcard.

In operation 416, user computing device 10 generates a key using the temporary password as a seed. The key may be generated by using the temporary password as a seed. The key may be used for any suitable encryption algorithm, similar to the key generation of operation 404 discussed with reference to FIG. 4A, although in this case the encryption algorithm need not be a block algorithm. In one embodiment, the algorithm may be a format preserving encryption (FPE) algorithm, where the temporary password is the same length or has a greater length than the user-associated password. By using the temporary password as a seed to an FPE key, a format of the user-associated password may be maintained, thereby enabling legacy systems to incorporate embodiments of the encryption techniques discussed herein without modification.

In operation 418, user computing device 10 encrypts the user-associated password using at least the generated key, resulting in an encrypted user-associated password. The user-associated password may be encrypted similar to the encryption of operation 408 discussed with reference to FIG. 4A. In one embodiment, an element of the user-associated password may be changed based on a corresponding element of the temporary password. For example, where the user-associated password is in decimal form and the temporary password is in decimal form, a digit of the user-associated password may be increased and cycled through single-value digits (e.g., 0 to 9) a number of times equal to the value of a corresponding digit of the temporary password. All digits of the user-associated password may be modified this way based on a corresponding digit of the temporary password. In cases where the temporary password has a greater number of digits than the user-associated password, a select subset of digits from the temporary password may used to modify digits of the user-associated password.

Figure 4C:
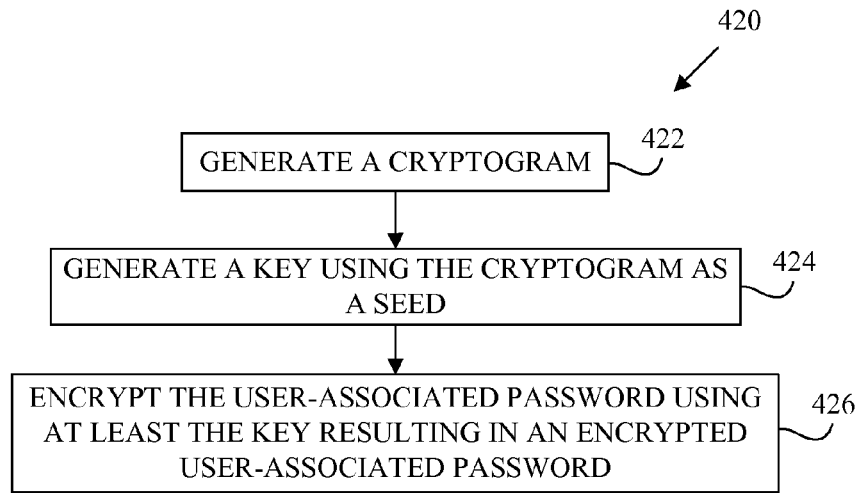
FIG. 4C is a flowchart depicting operations for encrypting a user-associated password in accordance with a third embodiment.

FIG. 4C is a flowchart depicting operations 420 for encrypting a user-associated password in accordance with a third embodiment. Operations 420 depict a sequence of operations by which a device such as user computing device 10 may operate to encrypt a user-associated password, such as the user-associated password discussed with reference to FIGS. 2 and/or 3. The encryption may be performed as part of a process in which user 50 desires to engage in a transaction, such as a transaction for the purchase of goods or services, the transfer of funds, access to a secure resource, etc. as discussed with reference to FIG. 2. While operations 420 are discussed with reference to the systems 100 and 200 discussed with reference to FIGS. 1 and 2, and with reference to the sequence of operations discussed with reference to FIGS. 2 and 3, operations 420 may additionally or alternatively be applied to other systems and sequences of operations in which user authentication is desired, and all such alternatives are within the scope of the embodiments disclosed herein.

In operation 422, user computing device 10 generates a cryptogram. The cryptogram may be generated similar to that discussed in operation 412 with reference to FIG. 4B.

In operation 424, user computing device 10 may generate a key using the cryptogram as a seed. The key may be generated by using the cryptogram as a seed. The key may be used for any suitable encryption algorithm, including one or more of those discussed in operation 404 with reference to FIG. 4A. Generating a key in accordance with operation 424 is similar to that discussed in operation 416, except in this case the key is generated using the cryptogram directly as a seed rather than first generating a temporary password using the cryptogram and then using the temporary password as a seed. Directly using the cryptogram as a key may advantageously reduce the processing requirements for encrypting the user-associated password.

In operation 426, user computing device 10 encrypts the user-associated password using at least the key resulting in the encrypted user-associated password. Encrypting the user-associated password is similar to operation 418 discussed with reference to FIG. 4B, although in this case a different key is used.

Figure 4D:
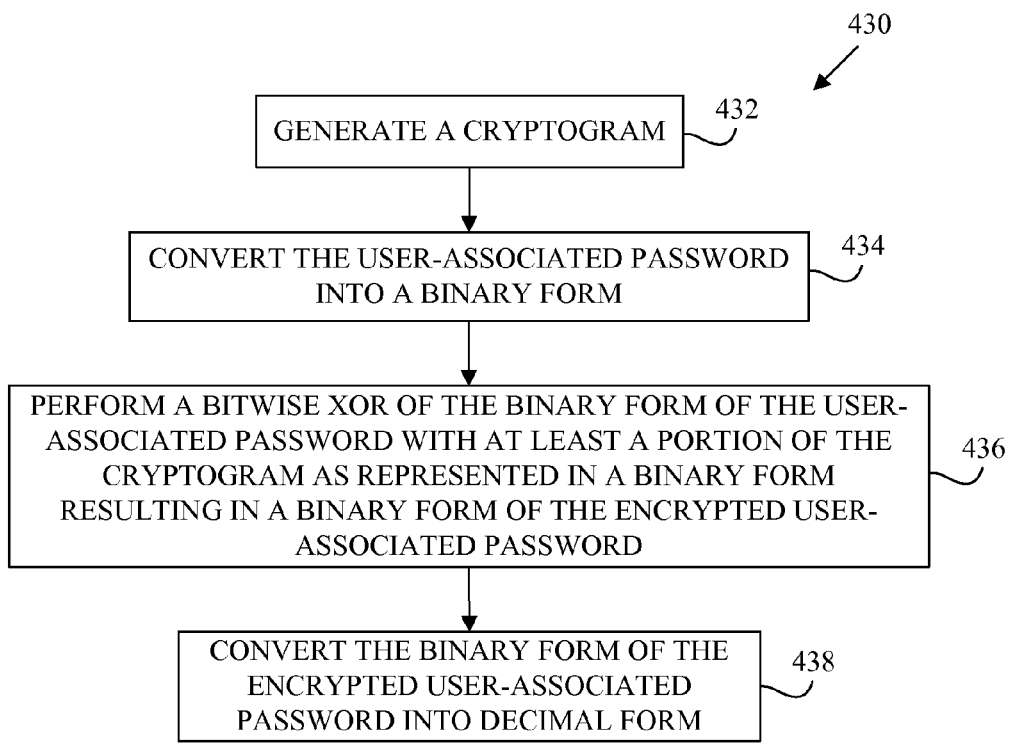
FIG. 4D is a flowchart depicting operations for encrypting a user-associated password in accordance with a fourth embodiment.

FIG. 4D is a flowchart depicting operations 430 for encrypting a user-associated password in accordance with a fourth embodiment. Operations 430 depict a sequence of operations by which a device such as user computing device 10 may operate to encrypt a user-associated password, such as the user-associated password discussed with reference to FIGS. 2 and/or 3. The encryption may be performed as part of a process in which user 50 desires to engage in a transaction, such as a transaction for the purchase of goods or services, the transfer of funds, access to a secure resource, etc. as discussed with reference to FIG. 2. While operations 430 are discussed with reference to the systems 100 and 200 discussed with reference to FIGS. 1 and 2, and with reference to the sequence of operations discussed with reference to FIGS. 2 and 3, operations 430 may additionally or alternatively be applied to other systems and sequences of operations in which user authentication is desired, and all such alternatives are within the scope of the embodiments disclosed herein.

In operation 432, user computing device 10 generates a cryptogram. The cryptogram may be generated similar to that discussed in operation 422 with reference to FIG. 4C.

In operation 434, user computing device 10 converts the user-associated password into a binary form. For example, the user-associated password may be received in a form other binary, such as a decimal form, hexadecimal form, alphanumeric form, alphabetic form, etc. User computing device 10 may then convert the received user-associated password into a binary form. In some cases, the user-associated password may be received in binary form, in which case operation 434 may be omitted. In one embodiment, the user-associated password may be received as a 6 digit decimal string. Conversion of the user-associated password into binary form may result in a user-associated password represented as 20 bits.

In operation 436, user computing device 10 performs a bitwise XOR of the binary form of the user-associated password with at least a portion of the cryptogram as represented in a binary form resulting in a binary form of the encrypted user-associated password. That is, the generated cryptogram may be generated in binary form, or may be generated in a non-binary form and subsequently converted to binary form. User computing device 10 may then perform a bitwise XOR of the user-associated password with the cryptogram, resulting in an encrypted user-associated password in binary form.

In one embodiment, the cryptogram may be an authorization request cryptogram (ARQC) generated in accordance with the Europay, Mastercard, and Visa consortium (EMV) standards for Chipcards. The cryptogram in this case is typically 8 bytes, or 64 bits, in length. The received user-associated password may be in decimal form, and may have a length of, for example, 6 digits. As a result of converting the user-associated password to binary form, the user-associated password may have a bit length of 20 bits. A bitwise XOR may then be performed of the user-associated password and the cryptogram, where only a portion of the cryptogram bits are used. The portion may be any suitable portion, such as the 20 lowest significant bits (LSB) of the cryptogram, the 20 highest significant bits (HSB), or any other suitable selection of bits from the cryptogram.

In operation 438, user computing device 10 converts the binary form of the encrypted user-associated password into decimal form. The decimal form of the encrypted user-associated password may then be communicated in place of the user-associated password. In some embodiments, user computing device 10 may convert the binary form of the encrypted user-associated password into other forms suitable for communication, such as hexadecimal, alphanumeric, alphabetic, symbolic, etc.

It should be appreciated that the specific operations illustrated in FIGS. 4A to 4D provide particular methods of encrypting a user-associated password, according to certain embodiments of the present invention. Other sequences of operations may also be performed according to alternative embodiments. Moreover, the individual operations illustrated in FIGS. 4A to 4D may include multiple sub-operations that may be performed in various sequences as appropriate to the individual operation. Furthermore, additional operations may be added or existing operations removed depending on the particular applications. It should also be recognized that while specific examples have been provided in the context of EMV-based one-time passwords (OTP), other kinds of OTP, such as the Internet Engineering Task Force (IETF) standard Hashed Method Authentication Code (HMAC) OTP, including analogous variants for the decimal OTP and its binary precursor. Accordingly, one of ordinary skill in the art would recognize and appreciate many variations, modifications, and alternatives.

Figure 5:
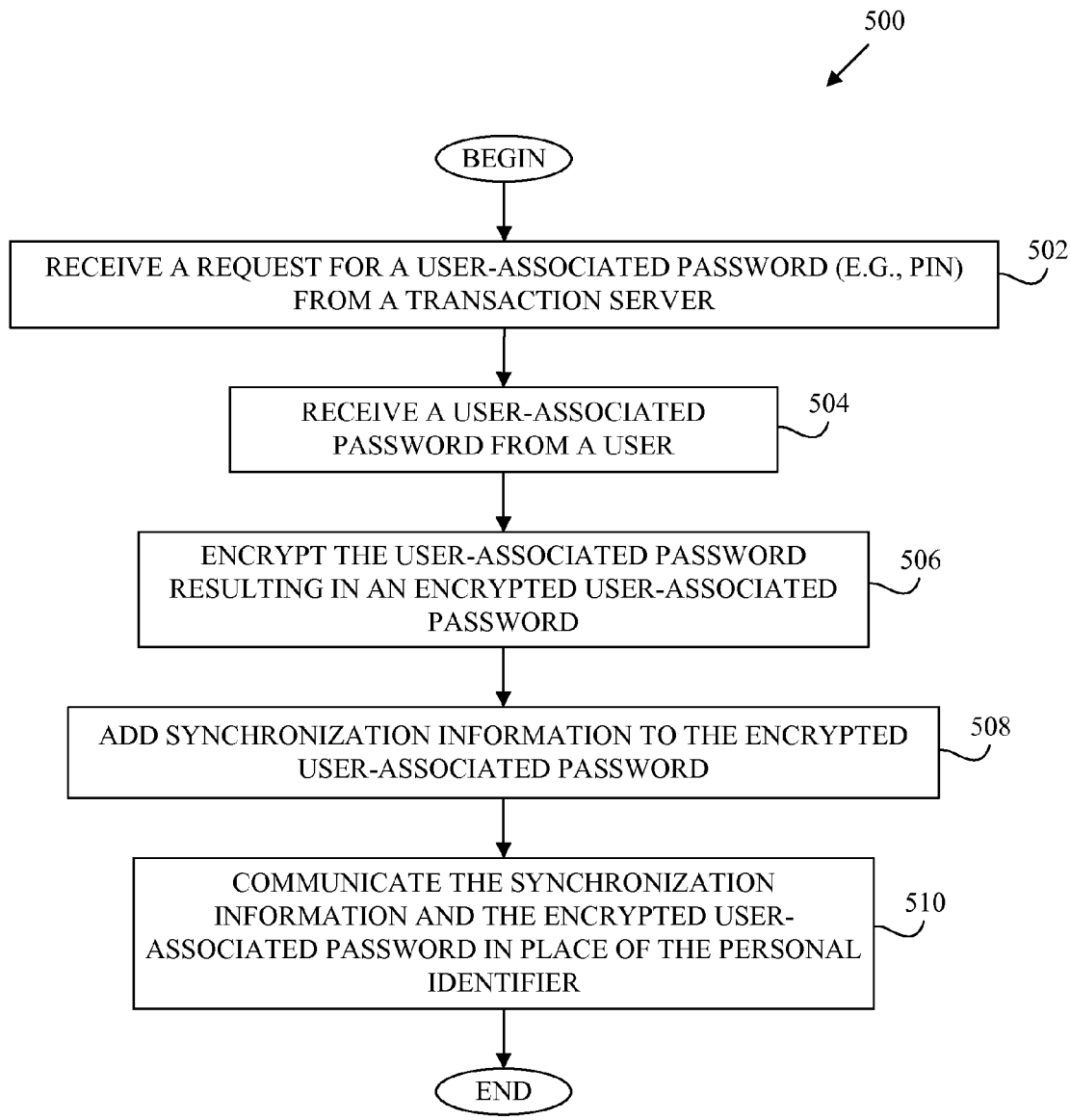
FIG. 5 is a flowchart depicting operations of a user computing device in accordance with a second embodiment.

FIG. 5 is a flowchart depicting operations 500 of a user computing device 10 in accordance with a second embodiment. Operations 500 depict a sequence of operations by which user computing device 10 may operate to facilitate authentication of a user associated with user computing device 10, such as user 50 discussed with reference to FIG. 2. The authentication may be performed as part of a process in which user 50 desires to engage in a transaction, such as a transaction for the purchase of goods or services, the transfer of funds, access to a secure resource, etc. as discussed with reference to FIG. 2. While operations 500 are discussed with reference to the systems 100 and 200 discussed with reference to FIGS. 1 and 2, and with reference to the sequence of operations discussed with reference to FIG. 2, operations 500 may additionally or alternatively be applied to other systems and sequences of operations in which user authentication is desired, and all such alternatives are within the scope of the embodiments disclosed herein.

Operations 500 shown in FIG. 5 and discussed herein are similar to those discussed with reference to FIG. 3. For example, operations 502, 504, 506, and 510 are similar to operations 302, 304, 306, and 308 discussed with reference to FIG. 3, and accordingly detailed discussion is omitted. However, operations 500 include operation 508, in which user computing device 10 adds synchronization information to the encrypted user-associated password. That is, after user computing device 10 encrypts the user-associated password resulting in an encrypted user-associated password, as shown in operation 506 and discussed in operation 306, user computing device 10 adds synchronization information to the encrypted user-associated password.

The synchronization information added to the encrypted user-associated password may be any suitable synchronization information for facilitating decryption of the encrypted user-associated password, where the synchronization information operates to provide a unique code to both the encrypting and decrypting devices. The unique code may be based on time (e.g., a timestamp), a continually increasing and/or cyclic counter (e.g., an ATC), or other unique data. For example, in some embodiments, the user-associated password may be encrypted using a time-synchronized temporary password, such as a time-synchronized OTP. In one embodiment, where temporary passwords and/or cryptograms are generated in accordance with the Europay, Mastercard, and Visa consortium (EMV) standards for Chipcards, the Application Transaction Counter (ATC) may be used to encrypt and decrypt the user-associated password. By communicating the synchronization information together with the encrypted user-associated password, the entity decrypting the encrypted user-associated password (e.g., user-associated password decryption server 30 shown in FIGS. 1 and 2) may use the synchronization information to generate its own OTP that may be used to decrypt the encrypted user-associated password.

In operation 510, user computing device 10 communicates the encrypted user-associated password and synchronization information in place of the user-associated password. The synchronization information may be appended to or embedded in the encrypted user-associated password in any suitable fashion, such as by adding it to the front of the user-associated password, the back of the user-associated password, or to any other suitable location of the user-associated password.

It should be appreciated that the specific operations illustrated in FIG. 5 provide particular methods of encrypting a user-associated password, according to certain embodiments of the present invention. Other sequences of operations may also be performed according to alternative embodiments. Moreover, the individual operations illustrated in FIG. 5 may include multiple sub-operations that may be performed in various sequences as appropriate to the individual operation. Furthermore, additional operations may be added or existing operations removed depending on the particular applications. One of ordinary skill in the art would recognize and appreciate many variations, modifications, and alternatives.

Figure 6:
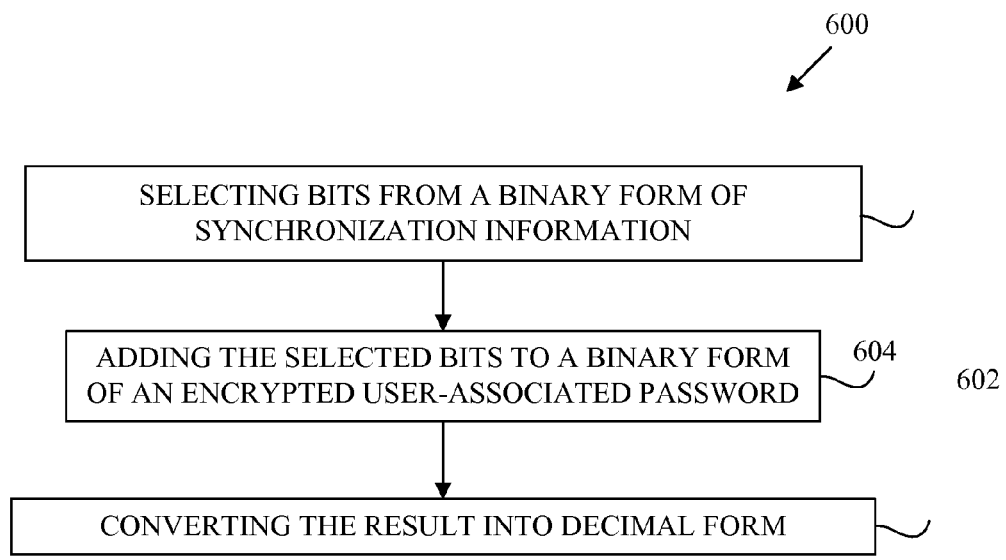
FIG. 6 is a flowchart depicting operations for adding synchronization information to an encrypted user-associated password in accordance with at least one embodiment.

FIG. 6 is a flowchart depicting operations for adding synchronization information to an encrypted user-associated password in accordance with at least one embodiment. Operations 600 depict a sequence of operations by which user computing device 10 may operate to facilitate authentication of a user associated with user computing device 10, such as user 50 discussed with reference to FIG. 2. The authentication may be performed as part of a process in which user 50 desires to engage in a transaction, such as a transaction for the purchase of goods or services, the transfer of funds, access to a secure resource, etc. as discussed with reference to FIG. 2. While operations 600 are discussed with reference to the systems 100 and 200 discussed with reference to FIGS. 1 and 2, and with reference to the sequence of operations discussed with reference to FIG. 2, operations 600 may additionally or alternatively be applied to other systems and sequences of operations in which user authentication is desired, and all such alternatives are within the scope of the embodiments disclosed herein.

In operation 602, user computing device 10 selects bits from a binary form of synchronization information. For example, the Application Transaction Counter (ATC) (used in the EMV standard) may be used as synchronization information for encrypting and decrypting the user-associated password. The ATC is 2 bytes (16 bits) in length. User computing device 10 may select bits from the ATC, such as one or more of the lowest significant bits (LSB) of the ATC, one or more of the highest significant bits (HSB) of the ATC, or any suitable combination thereof. In one embodiment, 7 or 8 of the LSB of the ATC may be selected.

In operation 604, user computing device 10 adds the selects bits to a binary form of an encrypted user-associated password. The user-associated password may be encrypted in accordance with one or more of the techniques previously discussed with reference to, for example, FIGS. 4A to 4D. In one example, the user-associated password may be generated in binary form, such as in accordance with operations 432 to 436 of FIG. 4D. In this case, the selected bits, such as the selected bits of the ATC, may be appended to the binary form of the generated encrypted user-associated password. In another example, the user-associated password may be generated in a non-binary form. In this case, the user-associated password may first be converted into binary form and the bits, such as bits of the ATC, may be appended to binary form of the encrypted user-associated password.

In operation 606, user computing device 10 converts the result into decimal form. For example, after adding the selected bits to a binary form of the encrypted user-associated password, the result can be converted into decimal form. The decimal form result may then be communicated in lieu of the requested user-associated password. In some embodiments, user computing device 10 may convert the result into other suitable forms for communication in lieu of the requested user-associated password.

It should be appreciated that the specific operations illustrated in FIG. 6 provide particular methods of adding synchronization information to an encrypted user-associated password, according to certain embodiments of the present invention. Other sequences of operations may also be performed according to alternative embodiments. Moreover, the individual operations illustrated in FIG. 6 may include multiple sub-operations that may be performed in various sequences as appropriate to the individual operation. Furthermore, additional operations may be added or existing operations removed depending on the particular applications. One of ordinary skill in the art would recognize and appreciate many variations, modifications, and alternatives.

Figure 7A:
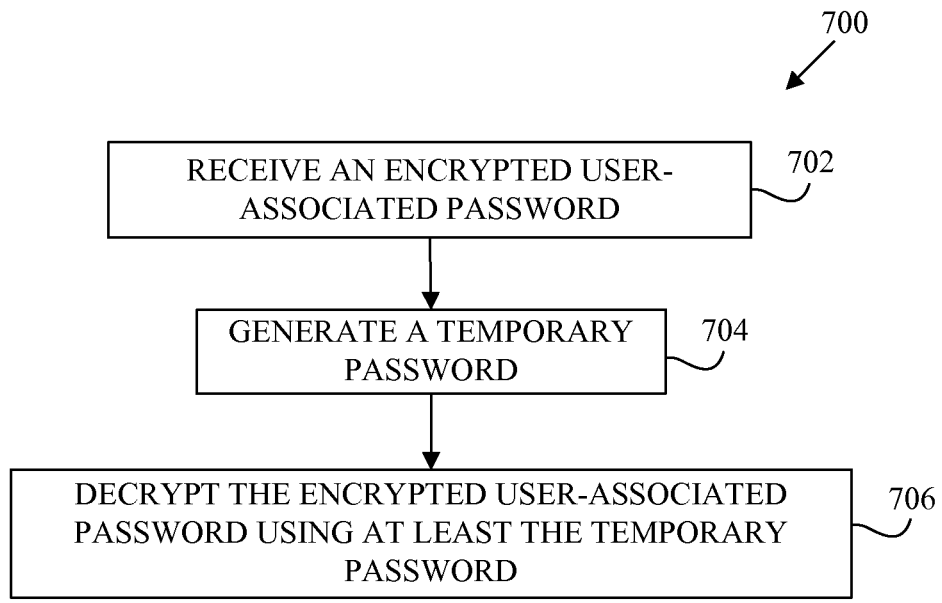
FIG. 7A is a flowchart depicting operations for decrypting an encrypted user-associated password in accordance with a first embodiment.

FIG. 7A is a flowchart depicting operations 700 for decrypting a user-associated password in accordance with a first embodiment. Operations 700 depict a sequence of operations by which a server or system such as user-associated password decryption server 30 may operate to decrypt an encrypted user-associated password, such as the encrypted user-associated password discussed with reference to one or more of FIGS. 1 to 6. The decryption may be performed as part of a process in which user 50 desires to engage in a transaction, such as a transaction for the purchase of goods or services, the transfer of funds, access to a secure resource, etc. as discussed with reference to FIG. 2. While operations 700 are discussed with reference to the systems 100 and 200 shown in FIGS. 1 and 2, and with reference to the sequence of operations discussed with reference to FIGS. 1 to 6, operations 700 may additionally or alternatively be applied to other systems and sequences of operations in which user authentication is desired, and all such alternatives are within the scope of the embodiments disclosed herein.

In operation 702, user-associated password decryption server 30 receives an encrypted user-associated password. The user-associated password may have been encrypted using any one or more of the encryption techniques discussed herein. For example, the user-associated password may have been encrypted using any one or more of the encryption techniques discussed with reference to FIGS. 3 to 6. In one embodiment, the encrypted user-associated password may be received as part of a process for authenticating the identity of a party privy to a transaction. For example, the encrypted user-associated password may be received as part of a sequence of operations such as those discussed with reference to FIG. 2, and in particular may be received similar to operation 6 discussed with reference to FIG. 2.

In operation 704, user-associated password decryption server 30 generates a temporary password. The temporary password may be the same as any of the temporary passwords previously discussed. For example, with reference to operation 402 shown in FIG. 4A, the temporary password may be dynamic password, a one-time password, or other suitable password that is valid for authentication purposes only for a limited number of transactions or transaction attempts. Accordingly, in some embodiments, the temporary password generated by identifier decryption server 30, like the temporary password generated by user computing device 10, may be generated from a cryptogram, similar to the temporary password generation discussed with reference to FIGS. 4B to 4D, whereby user-associated password decryption server 30 is operable to generate a cryptogram prior to generating the temporary password.

In some embodiments, the temporary password generated in accordance with operation 704 is identical to the temporary password generated by user computing device 10. By generating an identical temporary password, the temporary password may subsequently be used as a symmetric key to decrypt the encrypted user-associated password.

In operation 706, user-associated password decryption server 30 decrypts the encrypted user-associated password using at least the temporary password. For example, user-associated password decryption server 30 may use the temporary password as a key to decrypt the encrypted user-associated password. In some embodiments, user-associated password decryption server 30 may use the temporary password as a seed to generate a key for decrypting the encrypted user-associated password. For example, similar to the encryption techniques discussed with reference to FIGS. 4A to 4C, user-associated password decryption server 30 may generate a key from the temporary password by using the temporary password as a seed. According, in some embodiments, user-associated password decryption server 30 may additionally or alternatively decrypt the encrypted user-associated password using the key generated from the temporary password.

Figure 7B:
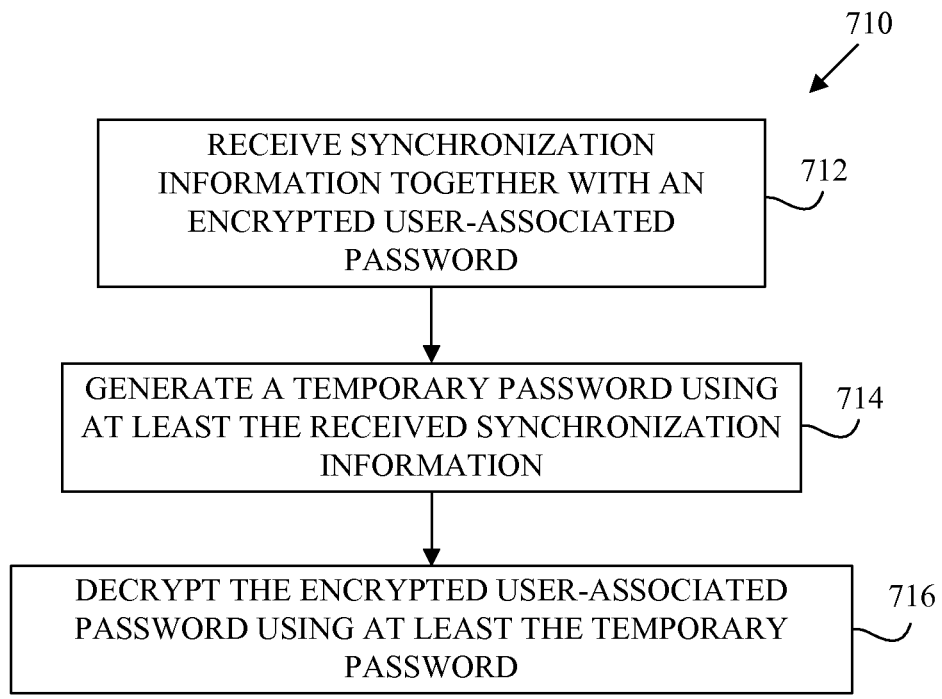
FIG. 7B is a flowchart depicting operations for decrypting an encrypted user-associated password in accordance with a second embodiment.

FIG. 7B is a flowchart depicting operations 710 for decrypting a user-associated password in accordance with a second embodiment. Operations 710 depict a sequence of operations by which a server or system such as user-associated password decryption server 30 may operate to decrypt an encrypted user-associated password, such as the encrypted user-associated password discussed with reference to one or more of FIGS. 1 to 6. The decryption may be performed as part of a process in which user 50 desires to engage in a transaction, such as a transaction for the purchase of goods or services, the transfer of funds, access to a secure resource, etc. as discussed with reference to FIG. 2. While operations 710 are discussed with reference to the systems 100 and 200 shown in FIGS. 1 and 2, and with reference to the sequence of operations discussed with reference to FIGS. 1 to 6, operations 710 may additionally or alternatively be applied to other systems and sequences of operations in which user authentication is desired, and all such alternatives are within the scope of the embodiments disclosed herein.

In operation 712, user-associated password decryption server 30 receives synchronization information together with an encrypted user-associated password. Receipt of an encrypted user-associated password is similar to that discussed in operation 702 with respect to FIG. 7A. However, in this case, synchronization information is received together with the encrypted user-associated password. For example, the synchronization information may be appended to or embedded in the encrypted user-associated password. Where the synchronization information is embedded in the encrypted user-associated password, user-associated password decryption server 30 may extract the synchronization information from the encrypted user-associated password. In some embodiments, the synchronization information may be received separate from the encrypted user-associated password.

In operation 714, user-associated password decryption server 30 generates a temporary password using at least the received synchronization information. For example, where user computing device 10 uses a one-time password (OTP) algorithm that uses synchronization, the synchronization information generated by user computing device 10 and appended or embedded in the encrypted user-associated password may subsequently be extracted as necessary and used to generate an identical OTP.

In operation 716, user-associated password decryption server 30 decrypts the encrypted user-associated password using at least the temporary password generated in accordance with operation 714. For example, where user computing device 10 uses an OTP algorithm that uses synchronization, the generated identical OTP may be used by user-associated password decryption server 30 as a key to decrypt the encrypted user-associated password.

Figure 7C:
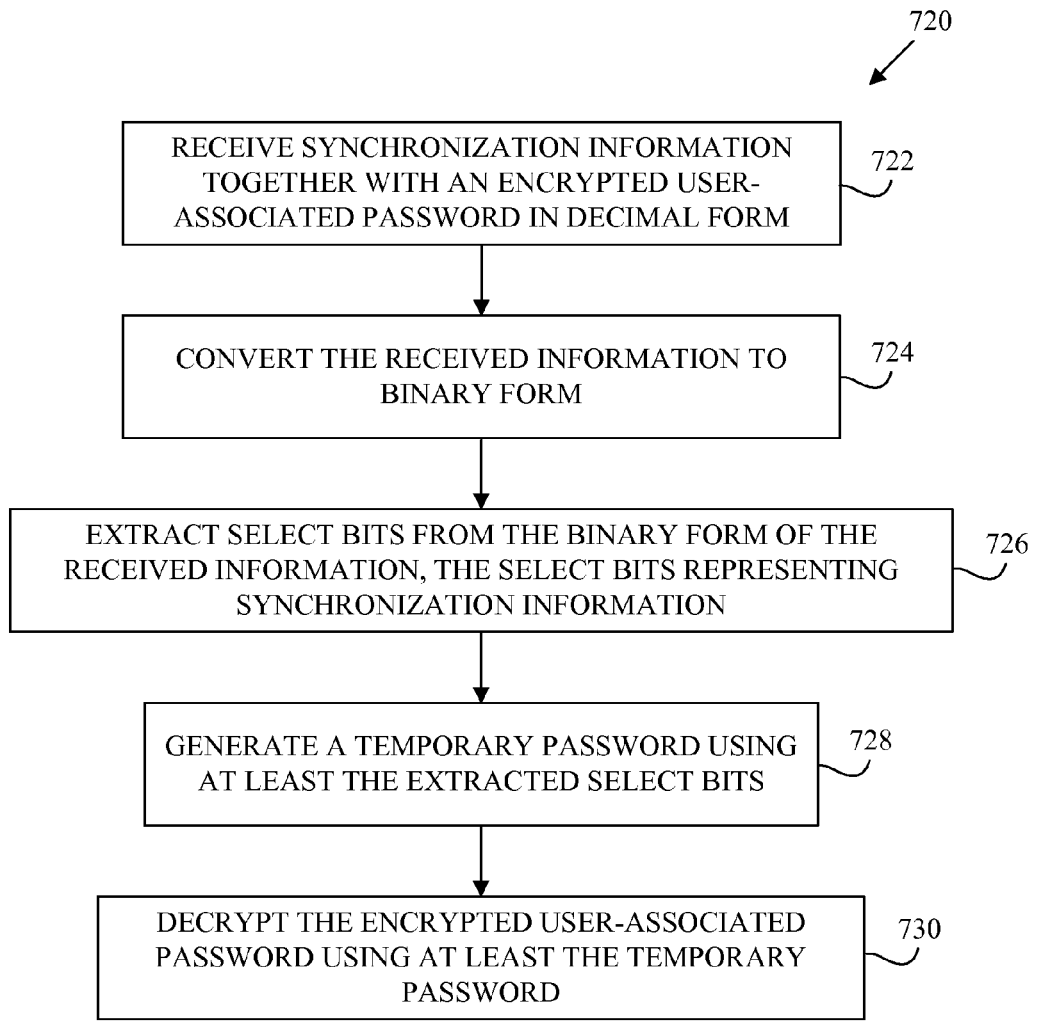
FIG. 7C is a flowchart depicting operations for decrypting an encrypted user-associated password in accordance with a third embodiment.

FIG. 7C is a flowchart depicting operations 720 for decrypting a user-associated password in accordance with a third embodiment. Operations 720 depict a sequence of operations by which a server or system such as user-associated password decryption server 30 may operate to decrypt an encrypted user-associated password, such as the encrypted user-associated password discussed with reference to one or more of FIGS. 1 to 6. The decryption may be performed as part of a process in which user 50 desires to engage in a transaction, such as a transaction for the purchase of goods or services, the transfer of funds, access to a secure resource, etc. as discussed with reference to FIG. 2. While operations 720 are discussed with reference to the systems 100 and 200 shown in FIGS. 1 and 2, and with reference to the sequence of operations discussed with reference to FIGS. 1 to 6, operations 720 may additionally or alternatively be applied to other systems and sequences of operations in which user authentication is desired, and all such alternatives are within the scope of the embodiments disclosed herein.

In operation 722, user-associated password decryption server 30 receives synchronization information together with an encrypted user-associated password in decimal form. Receipt of synchronization information and encrypted user-associated password is similar to that discussed in operation 712 with respect to FIG. 7B. However, in this case the received information is in decimal form. For example, the received information may be a 6 digit, 7 digit, or 8 digit decimal.

In operation 724, user-associated password decryption server 30 converts the received information to binary form. In the embodiment shown in FIG. 7, user-associated password decryption server 30 converts the received information from decimal form to binary form. However, in other embodiments, user-associated password decryption server 30 may receive the synchronization information and encrypted user-associated password in a form other than decimal form, and operate to convert the received information, regardless of its form, into binary form.

In operation 726, user-associated password decryption server 30 extracts select bits from the binary form of the received information, the select bits representing synchronization information. For example, as discussed with reference to FIG. 6, select bits from a binary form of synchronization information may be appended to a binary form of a generated encrypted user-associated password. While the previous example discussed with reference to FIG. 6 discusses the use of select bits of the ATC as synchronization information, other bits representing synchronization may also or alternatively be used. Accordingly, in one embodiment, in operation 726, user-associated password decryption server 30 may extract the selected ATC bits or equivalent thereof that were added by user computing device.

In operation 728, user-associated password decryption server 30 generates a temporary password using at least the extract select bits. The temporary password may be any of the temporary passwords previously discussed. In one embodiment, where the bits extracted as synchronization information were initially select ATC bits, the temporary password may be a dynamic password (DP) generated in accordance with the Europay, Mastercard, and Visa consortium (EMV) standards for Chipcards. In another embodiment, the temporary password may be an authorization request cryptogram (ARQC) generated in accordance with the EMV standard.

In operation 730, user-associated password decryption server 30 decrypts the encrypted user-associated password using at least the temporary password generated in accordance with operation 728. This is similar to the decryption discussed in operations 706 and 716 discussed with reference to FIGS. 7A and 7B. In one embodiment, where encryption was performed in accordance with the EMV standards for Chipcards, user-associated password decryption server 30 may decrypt the encrypted user-associated password using one or more of the DP and ARQC.

It should be appreciated that the specific operations illustrated in FIGS. 7A to 7C provide particular methods of decrypting a user-associated password, according to certain embodiments of the present invention. Other sequences of operations may also be performed according to alternative embodiments. Moreover, the individual operations illustrated in FIGS. 7A to 7C may include multiple sub-operations that may be performed in various sequences as appropriate to the individual operation. Furthermore, additional operations may be added or existing operations removed depending on the particular applications. It should also be recognized that while specific examples have been provided in the context of EMV-based one-time passwords (OTP), other kinds of OTP, such as the Internet Engineering Task Force (IETF) standard Hashed Method Authentication Code (HMAC) OTP, including analogous variants for the decimal OTP and its binary precursor. Accordingly, one of ordinary skill in the art would recognize and appreciate many variations, modifications, and alternatives.

The operations described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

What is claimed is:

1. A method of encrypting authentication information, comprising:
    receiving a request for a user-associated password at a user computing device from a requesting device;
    receiving the user-associated password at the user computing device from a user, the user-associated password having a format that comprises a number of characters, wherein the user-associated password is a password that authenticates an identity of the user, thereby being authentication information;
    generating a temporary password, by the user computing device;
    generating, by the user computing device, a key from the temporary password;
    encrypting, by the user computing device, the received user-associated password using at least the key resulting in an encrypted user-associated password having the same format and the same number of characters as the received user-associated password; and
    communicating the encrypted user-associated password from the user computing device to the requesting device in place of the received user-associated password in response to the request for the user-associated password.

2. The method of claim 1, wherein encrypting the user-associated password comprises:
    generating the key for a block encryption algorithm from the temporary password;
    padding the received user-associated password resulting in a padded user-associated password; and
    encrypting the padded user-associated password using the generated key.

3. The method of claim 2, wherein the temporary password is a One Time Password (OTP), the block encryption algorithm is the Advanced Encryption Standard (AES), and the user-associated password is in decimal form.

4. The method of claim 1, wherein the temporary password is the same length as or has a greater length than the user-associated password, and encrypting the user-associated password comprises changing an element of the user-associated password based on a corresponding element of the temporary password.

5. The method of claim 1, further comprising generating a cryptogram wherein the temporary password is part of or all of the cryptogram, the encrypting the received user-associated password using at least the temporary password is based on the cryptogram.

6. The method of claim 1, further comprising:
    adding synchronization information to the encrypted user-associated password; and
    communicating the synchronization information from the user computing device to the requesting device together with the encrypted user-associated password in place of the user-associated password.

7. The method of claim 6, wherein the synchronization information comprises data from an Application Transaction Counter (ATC), a timestamp, or a received unique code.

8. The method of claim 1, wherein the format of the received user-associated password comprises a number of decimal digits, wherein the encrypted user-associated password has the same number of decimal digits as the received user-associated password.

9. A method of decrypting authentication information, comprising:
    receiving a user-associated password from a user, the user-associated password having a format that comprises a number of characters;
    storing the user-associated password in association with the user;
    sending a request to a user computing device for the user-associated password;
    receiving an encrypted user-associated password having the same format and the same number of characters from the user computing device in place of the requested user-associated password, wherein the encrypted user-associated password, when decrypted, authenticates an identity of the user by matching the stored user-associated password;
    generating a temporary password, at a decryption server as would have been done using the user computing device;
    decrypting the encrypted user-associated password using at least the temporary password, resulting in a user-associated password, the user-associated password being authentication information; and
    comparing the decrypted user-associated password to the stored user associated password.

10. The method of claim 9, further comprising:
    receiving synchronization information together with the encrypted user-associated password, wherein the temporary password is generated using at least the received synchronization information.

11. The method of claim 10, further comprising:
    converting the received synchronization information and user-associated password to binary form; and
    extracting select bits from the binary form, the select bits representing synchronization information;
    wherein the temporary password is generated using at least the select bits.

12. The method of claim 11, wherein the select bits are from an Application Transaction Counter (ATC).

13. A method of encrypting authentication information, comprising:
    receiving a request for a user-associated password at a user computing device from a requesting device;
    receiving the user-associated password at the user computing device from a user, the user-associated password having a decimal form, wherein the user-associated password is a password that authenticates an identity of the user, thereby being authentication information;
    generating a temporary password, by the user computing device;
    converting, by the user computing device, the user-associated password into a binary form;
    performing, by the user computing device, a bitwise XOR of the binary form of the user-associated password with at least a portion of the temporary password as represented in a binary form resulting in a binary and encrypted form of the user-associated password;
    converting, by the user computing device, the binary form of the encrypted user-associated password into decimal form; and communicating the decimal form of the encrypted user-associated password from the user computing device to the requesting device in place of the received user-associated password in response to the request for the user-associated password.

14. The method of claim 13, wherein the temporary password is a cryptogram.

15. The method of claim 13, further comprising:
adding bits from an Application Transaction Counter (ATC) to the binary form of the encrypted user-associated password before converting the binary form of the encrypted user-associated password into decimal form.

16. A device for encrypting authentication information, comprising:
a communication interface operable to receive a request from a requesting device for a user-associated password and to receive the user-associated password having a format that comprises a number of characters from a user, the user-associated password authenticates an identity of the user, thereby being authentication information; and
a processor operable to generate a temporary password, generate a key from the temporary password, and encrypt the received user-associated password using at least the key resulting in an encrypted user-associated password having the same format and the same number of characters as the received user-associated password, the processor operable to transmit the encrypted user-associated password via the communication interface to the requesting device in place of the received user-associated password in response to the request for the user-associated password.

17. The device of claim 16, a wherein the communication interface is operable to display the encrypted user-associated password to the user.

18. The device of claim 16, wherein the processor is further operable to generate a cryptogram, wherein the temporary password is part of or all of the cryptogram.

19. The device of claim 16, wherein the processor is further operable to add synchronization information to the encrypted user-associated password.

* * * * *